(12) United States Patent
Tomoshige et al.

(10) Patent No.: US 7,472,770 B2
(45) Date of Patent: Jan. 6, 2009

(54) HUB UNIT FOR USE IN ELECTRICALLY MOVABLE WHEELS AND VEHICLE COMPRISING THE HUB UNIT

(75) Inventors: Kazuhiro Tomoshige, Kasai (JP); Ryohei Adachi, Kanzaki-Gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 232 days.

(21) Appl. No.: 11/231,027

(22) Filed: Sep. 20, 2005

(65) Prior Publication Data

US 2006/0065452 A1    Mar. 30, 2006

(30) Foreign Application Priority Data

Sep. 28, 2004    (JP)    ............................. 2004-280907

(51) Int. Cl.
    *B60K 1/00*    (2006.01)
(52) U.S. Cl. ..................... 180/65.5; 310/67 A; 310/16
(58) Field of Classification Search ............... 180/65.5, 180/65.1, 220; 310/67 A, 16
    See application file for complete search history.

(56) References Cited

U.S. PATENT DOCUMENTS

| | | | | |
|---|---|---|---|---|
| 2,900,839 | A * | 8/1959 | Mackintosh | ................ 74/570.2 |
| 3,682,572 | A * | 8/1972 | Yarger | ........................ 417/273 |
| 4,137,891 | A * | 2/1979 | Dalrymple | ................... 123/245 |
| 5,019,733 | A * | 5/1991 | Kano et al. | ..................... 310/61 |
| 5,350,039 | A * | 9/1994 | Voss et al. | ................. 184/6.16 |
| 5,555,956 | A * | 9/1996 | Voss et al. | ................. 184/6.16 |
| 5,944,497 | A * | 8/1999 | Kershaw et al. | ........... 417/423.8 |
| 6,082,974 | A * | 7/2000 | Takemoto et al. | ........... 417/366 |
| 6,100,615 | A * | 8/2000 | Birkestrand | ................ 310/75 C |
| 6,276,475 | B1 * | 8/2001 | Nakanosono | .............. 180/65.8 |
| 6,355,996 | B1 * | 3/2002 | Birkestrand | ................... 310/54 |
| 6,437,470 | B1 * | 8/2002 | Hsu | ......................... 310/75 R |
| 6,672,818 | B1 * | 1/2004 | Terracol et al. | ............. 417/420 |
| 6,872,056 | B2 * | 3/2005 | Stiefel | ......................... 417/221 |
| 6,940,192 | B2 * | 9/2005 | Katsuzawa et al. | ............ 310/58 |
| 6,974,399 | B2 * | 12/2005 | Lo | .................................. 475/5 |
| 7,131,825 | B2 * | 11/2006 | Wos | ........................ 417/423.1 |
| 2005/0214135 | A1 * | 9/2005 | Shibuya et al. | .............. 417/357 |

(Continued)

FOREIGN PATENT DOCUMENTS

EP    0 469 995 A1    2/1992

(Continued)

*Primary Examiner*—Jeffrey J Restifo
(74) *Attorney, Agent, or Firm*—Arnold B. Silverman; Carol A. Marmo; Eckert Seamans Cherin & Mellott, LLC

(57) ABSTRACT

A hub unit for use in electrically assisted bicycles is improved in an effect to cool a motor incorporated in the unit. The hub unit has a motor 9 comprising a stator 3 and a rotor 4, and a hub 7 enclosing the motor 9 therein and rotatingly drivable by the rotation of the rotor 4. The unit has a pump 8 for discharging air from inside the hub 7 with the rotation of the hub 7. The air is discharged from inside the hub 7 by the operation of the pump 8, whereby air is admitted into the hub 7 from outside through an air port 59 formed in the hub 7 and is supplied to the motor 9 to cool the motor 9 and reliably prevent the motor from overheating.

6 Claims, 5 Drawing Sheets

U.S. PATENT DOCUMENTS

2005/0264111 A1* 12/2005 Tanaka et al. ............. 310/75 C
2005/0264112 A1* 12/2005 Tanaka et al. ............. 310/75 C

FOREIGN PATENT DOCUMENTS

| | | |
|---|---|---|
| EP | 0 822 136 A2 | 2/1998 |
| JP | 08068333 | 3/1996 |
| JP | 2002-514550 | 5/2002 |
| JP | 2004025941 | 1/2004 |
| WO | WO 99/58394 | 11/1999 |

* cited by examiner

F I G. 4
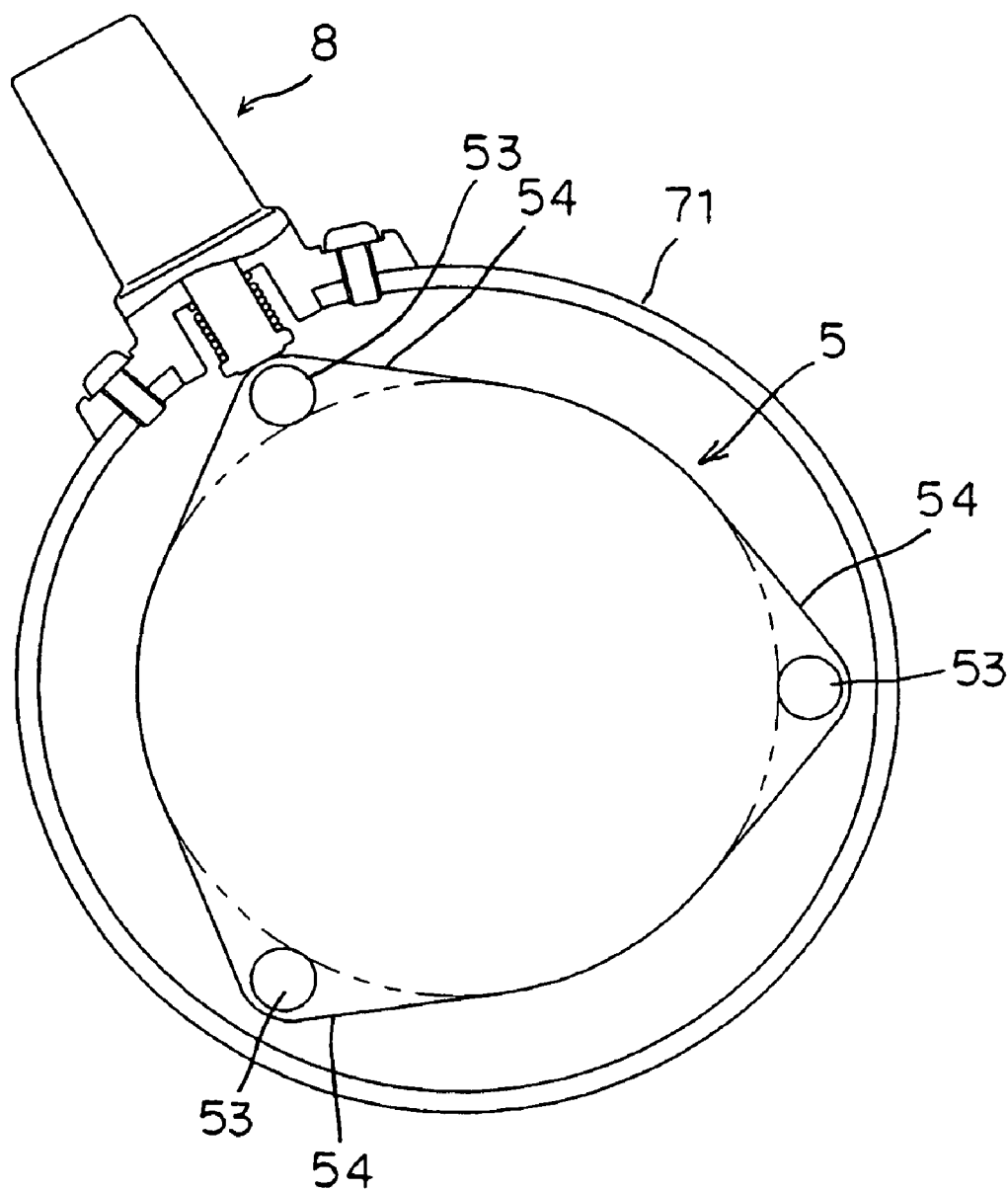

HUB UNIT FOR USE IN ELECTRICALLY MOVABLE WHEELS AND VEHICLE COMPRISING THE HUB UNIT

FIELD OF THE INVENTION

The present invention relates to hub units for use in electrically movable wheels, and to electrically assisted bicycles, wheelchairs and like vehicles comprising the hub unit.

BACKGROUND OF THE INVENTION

As disclosed, for example, in JP-A No. 2002-514550, electrically assisted bicycles are known which have a hub unit provided on the hub of a wheel of the bicycle and incorporating a motor or the like therein, such that the motor is driven when the pedals are subjected to a load not lower than a predetermined value, permitting the rider to run up a slope with ease.

The hub unit becomes heated when the motor is energized. When overheated, the motor can not be rotated with high torque, so that there is a need to provide a contrivance to release the heat from the motor.

With the construction disclosed in the above patent publication, however, the stator is hermetically enclosed in a motor housing and therefore is not allowed to radiate heat effectively.

Accordingly, it is practice to enclose a coolant in the hub and to cool the motor housing from outside to suppress the generation of heat from the winding. In the case where the coolant is enclosed in the hub, there is a need to provide a measure for preventing the leakage of the coolant to result in a cost increase. The provision of the coolant entails a corresponding increase in weight.

An object of the present invention is to provide a hub unit which is improved in motor cooling effect to prevent the motor from overheating, and a vehicle comprising the hub unit.

SUMMARY OF THE INVENTION

The present invention provides a hub unit for use in electrically movable wheels which has a motor comprising a stator and a rotor, and a hub enclosing the motor therein and to be rotatingly driven by the rotation of the rotor, the hub unit being characterized in that the hub unit is provided with means for cooling the motor by admitting outside air into the hub with the rotation of the hub.

It is desired that the hub be provided with a fixing support shaft projecting in a fixed state from a motor housing on the axis of rotation of the hub and extending outward from the hub, and an air port for admitting air therethrough is formed in the vicinity of the fixing support shaft.

Preferably, a tube is connected to the air port and has an end extending to a position on an electrically movable vehicle where no water enters the tube.

Preferably, the hub is provided with a pump mechanism operable by a projecting portion formed on an outer periphery of a motor housing for discharging air from inside the hub.

Preferably, the stator comprises a pair of end plates opposed to each other with a stack of metal plates held therebetween and fastened to each other with bolts, and has an outer peripheral surface left exposed to face an inner surface of the hub between the end plates.

Preferably, the hub has enclosed therein a planetary gear mechanism operable by the rotation of the rotor, and has inner teeth formed on an inner surface thereof and meshing with planetary gears of the planetary gear mechanism.

According to the present invention, the motor can be automatically and efficiently cooled with the air admitted into the hub from outside with the rotation of the hub. This reliably prevents the motor from overheating.

The cooling means thus provided eliminates the need for a coolant conventionally enclosed in the hub for suppressing the overheating of the windings. The motor housing need not be provided with a cylindrical wall, while there is no need for the time and labor required for enclosing the coolant in the hub. The hub unit can therefore be fabricated at a reduced cost. The removal of the cylindrical wall and the coolant results in a corresponding weight reduction, while the absence of the cylindrical wall gives a correspondingly greater outside diameter to the stator, whereby increased torque is made available.

BRIEF DESCRIPTION OF THE DRAWINGS

FIG. 4 is a sectional view of the hub unit as it is seen from a different direction.

DESCRIPTION OF THE PREFERRED EMBODIMENT

Figure 1:
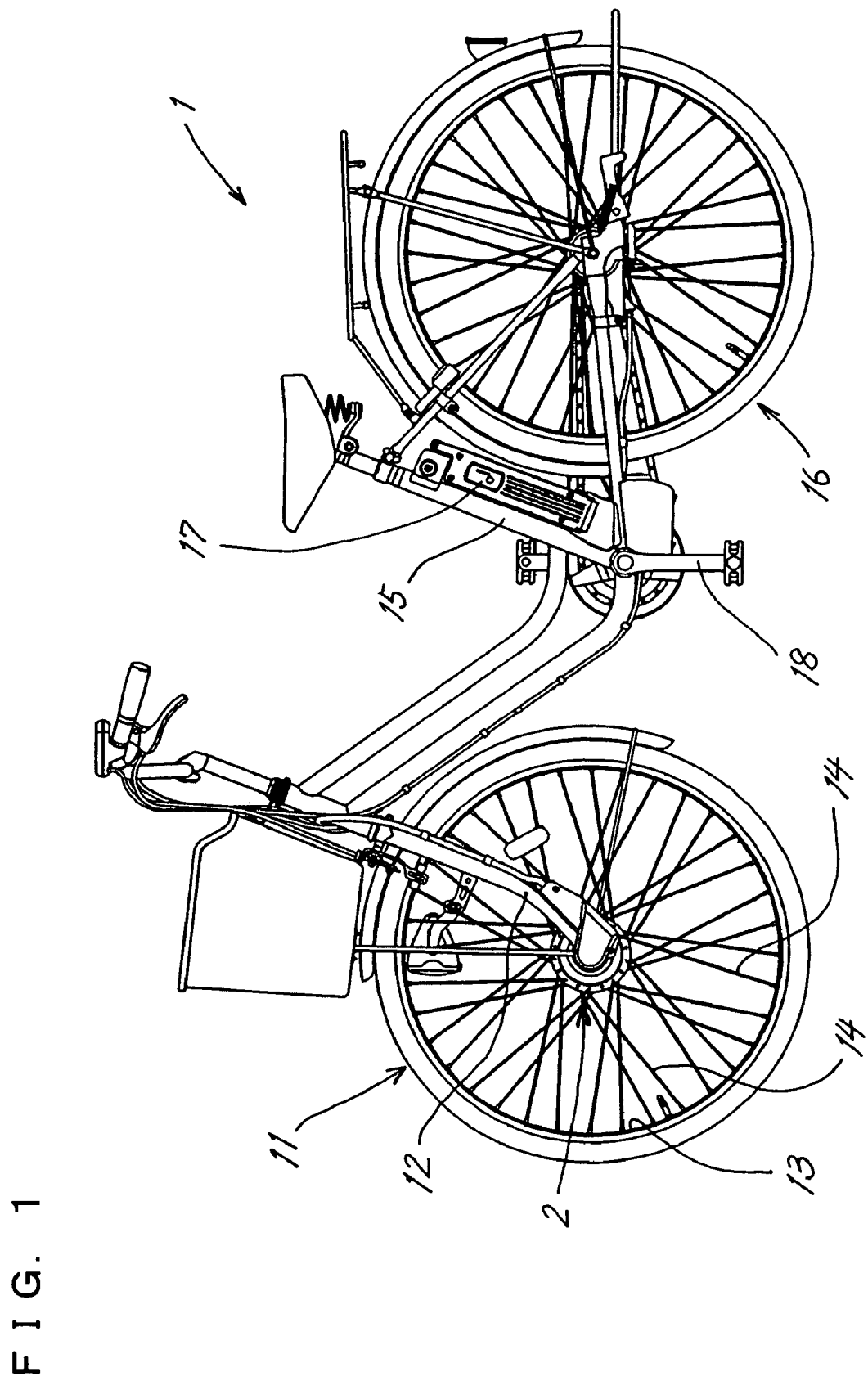
FIG. 1 is a front view showing an electrically assisted bicycle.

FIG. 1 shows an example of electrically assisted bicycle 1 having a hub unit 2 of the present invention.

A hub unit 2 is attached to the lower end of a front fork 12 of the bicycle 1, and the hub unit 2 and the rim 13 of a front wheel 11 are interconnected by spokes 14, 14.

A battery 17 is mounted on the bicycle between a seat post 15 and a rear wheel 16. A sensor (not shown) is provided on a suitable portion on which the pedaling force of the pedals 18 acts for energizing a motor 9 of the hub unit 2 by the battery 17 when the load on the pedals reaches a predetermined value.

The hub unit 2, which basically has the same construction as those of the prior art, has the above-mentioned motor 9 which comprises a stator 3 and a rotor 4, a hub 7 enclosing the motor 9 therein and rotatingly driven by the rotation of the motor 9, and a fixing support shaft 57 projecting in a fixed state from a motor housing 5 in alignment with the axis of rotation of the hub 7 and extending outward from the hub 7.

Figure 5:
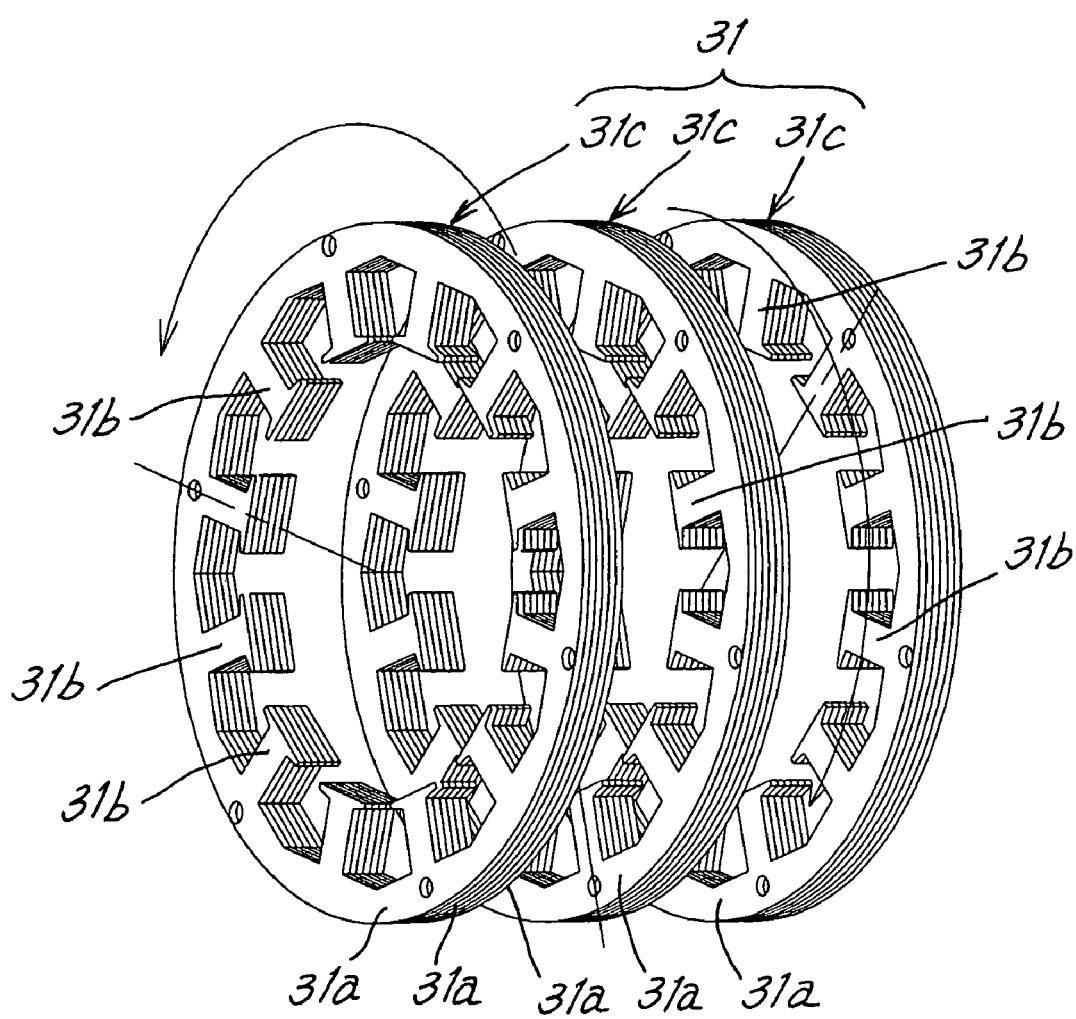
FIG. 5 is an exploded perspective view of a stack of metal plates.

The stator 3 has a metal plate stack 31 which comprises a specified number of metal plates 31a blanked out as shown in FIG. 5. Each of the metal plates 31a is in the form of a ring having a plurality of T-shaped projections 31b arranged on the inner periphery of the ring at equal intervals circumferentially thereof and projecting toward the center of the ring. The metal plate 31a has twelve projections 31b according to the present embodiment.

A winding 32 is provided on a stack of projections 31b in phase as a unit. Such a metal plate stack 31 is made conventionally by blanking out metal plates 31a from a metal sheet material with a blanking die and stacking the plates as blanked out at the same time.

For this reason, burrs created on respective adjacent pairs of blanked-out metal plates 31a, 31a are located at the same position or in alignment.

If burrs are formed on each single blanked-out metal plate 31a uniformly circumferentially thereof, the metal plate stack 31 will have a uniform thickness circumferentially thereof.

However, this is almost unlikely in actuality; when a single blanked-out metal plate 31a is observed, burrs are not positioned uniformly with respect to the circumferential direction. When metal plates 31a which are blanked out in succession are merely stacked in superposed layers, the single metal plate stack 31 will have a difference of about 0.1 to 0.3 mm in thickness and has a portion of large thickness and a portion of small thickness.

For the reason to be given later, there is a need to reduce the likelihood that the metal plate stack 31 will have a portion of large thickness and a portion of small thickness. Accordingly, the stack 31 is divided into units 31c each comprising a number of blanked-out metal plates 31a, and the units 31c are stacked as displaced from one another through a predetermined angle.

According to the present embodiment, the units 31c are stacked as displaced from one another through an angle obtained by dividing 360 deg by the number of units 31c to make the metal plate stack 31. For example, in the case where the number of units 31c is three, the three units 31c are displaced from one another by 120 deg, and a wire is provided around each of the projection stacks 31b to form the winding 32.

The metal plate stack 31 can be made easily by blanking out metal plates 31a from a metal sheet material, stacking a specified number of blanked-out metal plates 31a upon blanking, rotating the metal sheet material through a predetermined angle, e.g., through 120 deg according to the present embodiment, within a horizontal plane every time the specified number of metal plates are blanked out.

Incidentally, the number of inward projections 31b on the metal plate 31b blanked out is limited to a number which can be divided by the number of units 31c.

The rotor 4 is rotatably disposed inside the stator 3 concentrically therewith. The rotor 4 is made by inserting a rotating shaft 41 through the center of a stack 42 of circular metal plates so as to render the shaft 41 rotatable with the metal plate stack 42.

A plurality of permanent magnets 43 are embedded in the outer peripheral portion of the metal plate stack 42 in parallel to the rotating shaft 41 at equal intervals with S poles and N poles arranged alternately circumferentially of the stack.

The housing 5 for the motor 9 is made by holding the metal plate stack 31 of the stator 3 between a pair of first and second end plates 51, 52 opposed to each other axially of the stator 3 and fastening the two end plates 51, 52 together with a plurality of bolts 53 inserted through the outer peripheral portion of the stack 31 and tightened up. The end plates 51, 52 are fastened with the bolts 53 at cam-shaped projecting portions 54 projecting from the outer peripheries of the end plates 51, 52. The cam-shaped projecting portions 54 of the second end plate 52 serve as a cam for operating the pump 8 to be described later.

The metal plate stack 31 of the stator 3 serves the function of fixedly positioning the first end plate 51 and the second end plate 52 as spaced apart by a given distance.

The first end plate 51 and the second end plate 52 are provided with respective bearings 58, 58 inside the center portions thereof for the bearings 58, 58 to support opposite ends of the rotating shaft 41 of the rotor 4.

The first end plate 51 has a boss 56 on the outer side of the center portion thereof. The fixing support shaft 57 extends through the boss 56 to project outward. The shaft 57 is externally threaded as at 57b. Indicated at 59 is an air port formed in the first end plate 51 for holding the interior of the motor housing 5 in communication with the outside therethrough. As the air is discharged from inside the motor housing 5 by the operation of the pump 8 to be described later, the outside air is supplied to the motor 9 to cool the motor 9. An unillustrated tube is connected at one end to the air port 59, and the other end of the tube is fixed to the bicycle at a position where water is unlikely to enter the tube.

Provided externally of the second end plate 52 is a reduction mechanism for transmitting the rotation of the rotor 4 to the hub 7 upon a speed reduction.

The reduction mechanism of the present embodiment is a planetary gear reduction mechanism 6.

The reduction mechanism 6 has a planetary gear support frame 61 provided with three tubular legs 62 projecting toward and bearing against the second end plate 52 and equidistantly spaced circumferentially of the frame. The frame 61 is fastened to the second end plate 52 with bolts 63 extending through the respective legs 62.

Extending between and supported by the second end plate 52 and the planetary gear support frame 61 are three support shafts 64 equidistantly spaced circumferentially of the second end plate 52 and each adapted to rotatably support a planetary gear 65 thereon.

The planetary gear 65 comprises a large gear 65a positioned closer to the second end plate 52 and a small gear 65b positioned on the opposite side and coaxial with the gear 65a.

The large gear 65a of the planetary gear 65 is in mesh with a sun gear 60 formed on an end portion of the rotating shaft 41 of the rotor 4. The small gear 65b of the planetary gear 65 is in mesh with inner teeth 66a on the hub main body 71 to be described later.

The planetary gear support frame 61 has a boss 67 on the inner side of the center portion thereof. Extending through the center of the boss 67 is a fixing support shaft 57a projecting outward. The shaft 57a is externally threaded as at 57b.

The hub 7 comprises a hub main body 71 generally in the form of a cup having an opening at the center of its bottom wall and an opening over the entire area of the opposite side, and a closure plate 72 covering the entire opening.

The hub main body 71 covers the motor housing 5 and the planetary gear reduction mechanism 6. A bearing 73 is provided in an opening in the closure plate 72 around the boss 56 on the first end plate 51 of the motor housing 5. Fastened with screws to the inner side of the hub main body 71 is an annular member 66 concentric with the fixing support shaft 57. The inner teeth 66a meshing with the planetary gears 65 are formed on the inner periphery of the annular member 66.

The fixing support shaft 57a on the support frame 61 extends through the hub main body 71 to the outside. A bearing 75 is provided in the hub main body 71 around the fixing support shaft 57a.

The hub main body 71 has a circumferential wall 74 formed on its outer peripheral surface and extending therearound at each of opposite side portions. Spoke attaching holes 74a are formed in the circumferential wall 74 and arranged at regular intervals circumferentially of the wall.

The closure plate 72 covers the entire opening of the hub main body 71 and fastened to the body 71 with bolts 76.

Indicated at 8 is a pump fixed to the hub mina body 71 and opposed to the position of the cam-shaped projecting portions 54 of the second end plate 52. The pump 8 is operated by the cam-shaped projecting portions 54 of the second end plate 52 with the rotation of the hub 7 to discharge the air from inside the hub 7.

Figure 2:
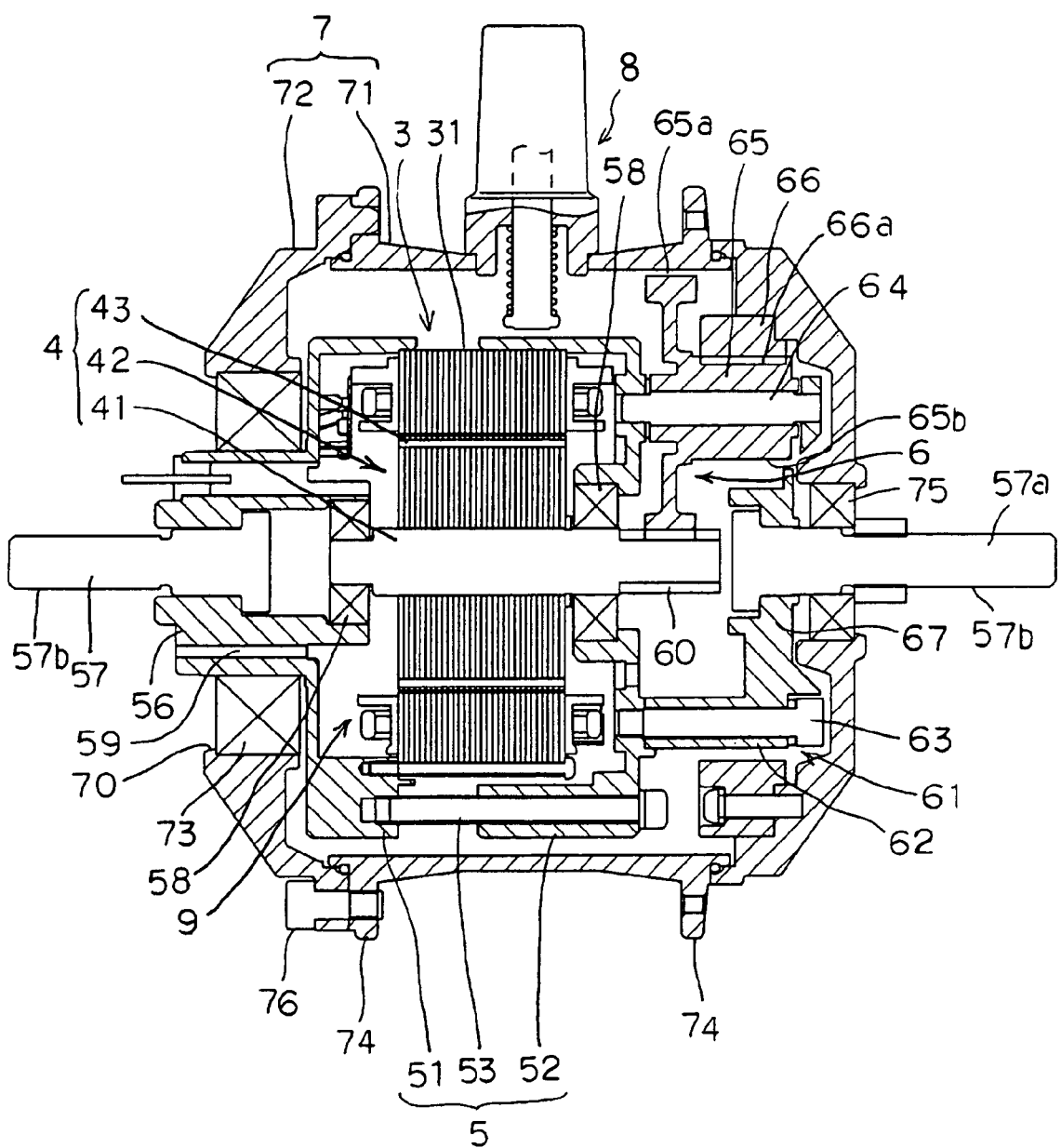
FIG. 2 is a sectional view of a hub unit.
Figure 3:
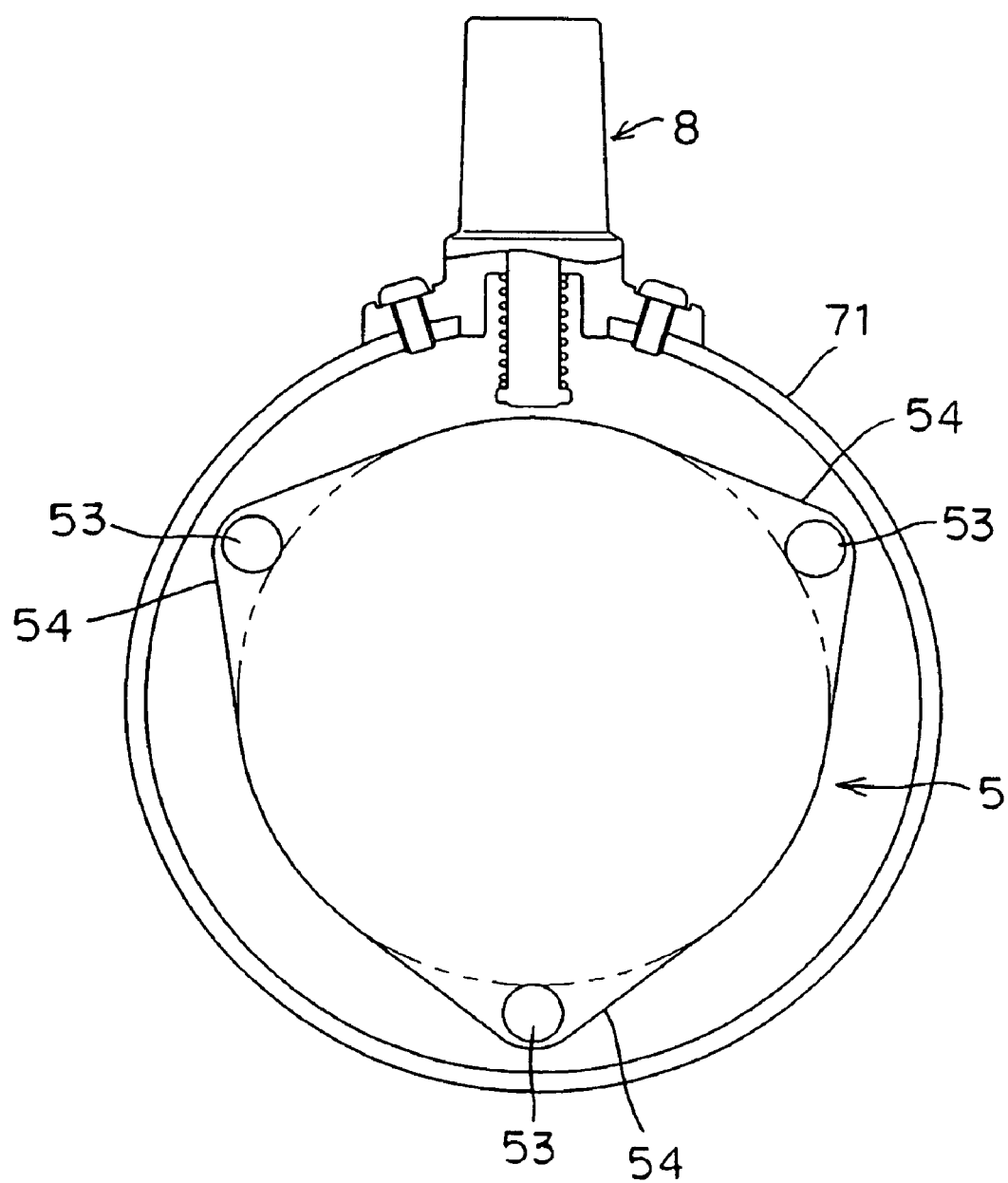
FIG. 3 is a sectional view of the hub unit as it is seen from a different direction.

With reference to FIG. 2, the rotating shaft 41 of the rotor 4, the fixing support shaft 57 on the first end plate 51 of the motor housing 5, and the fixing support shaft 57a extending through the hub main body 71 are arranged in alignment.

When both the fixing support shafts 57, 57a are secured to the front fork 12 of the bicycle by screw-thread engagement, the portions marked with lines slanting leftwardly downward in FIG. 2 are fixed portions, and the portions marked with lines slanting rightwardly downward are rotating portions.

When a load in excess of a specified value acts on the bicycle pedals 18 upon the pedals being stepped on, the battery 17 energizes the windings 32 of the stator 3, rotating the rotor 4.

The rotation of the rotor 4 rotates the sun gear 60 on the end of the rotating shaft 41 to rotate the planetary gears 65 in position. The rotation of the planetary gears 65 is transmitted through the inner teeth 66a to the hub 7 upon a speed reduction, drivingly rotating the front wheel 11.

With the rotation of the hub 7, the pump 8 discharges the air from inside the hub 7, whereby the outside air is supplied to the motor 7 through the air port 59, cooling the motor 5 to prevent the overheating of the motor 5.

By virtue of the rotation of the rotor 4, the bicycle 1 can be run with a reduced stepping force on the pedals 18. The energization of the windings 32 causes the windings 32 to generate heat, which is given to the stator 3. However, the motor housing 5 does not have a cylindrical wall which prevents the radiation of heat from the motor housing of the prior art, so that the heat given to the stator 3 is released directly through an opening between the pair of end plates 51, 52 holding the stator 3 therebetween, whereby the windings 32 can be prevented from overheating without necessitating the cooling liquid conventionally enclosed in the hub 7.

The outside air supplied to the motor 5 through the air port ensures promoted cooling of the stator 3, reliably preventing the windings 32 from overheating.

Because the cylindrical wall of the motor housing 5 can be dispensed with and further because there is no need for time and labor for enclosing the cooling liquid in the hub, the hub unit can be manufactured at a reduced cost. The hub unit can be obtained also with a weight reduction corresponding to the cylindrical wall and the cooling liquid omitted.

The stator 3 can be given an increased outside diameter corresponding to the absence of the cylindrical wall, with the result that increased torque is available.

If the metal plate stack 31 of the stator 3 has varying thicknesses circumferentially thereof in the above embodiment, the parallelism between the end plates 51, 52 involves errors, which produce a bending force acting on the rotating shaft 41 of the rotor 4 supported by bearings 58, 58 on the opposed end plates 51, 52, giving rise to the problem of causing trouble to the smooth rotation of the rotor 4. For this reason, an inherent problem will arise when the metal plate stack 31 of the stator 3 is held between the pair of end plates 51, 52 and if the end plates 51, 52 are fastened together by tightening up the bolts 53 so as to cause the thrust of screws to act on the stack 31 in the direction of stacking as practiced in the present embodiment.

According to the embodiment, however, a plurality of units 31c each comprising a specified number of metal plates 31a blanked out are stacked as displaced from one another by a predetermined angle as described above so as to render the metal plate stack 31 uniform in thickness circumferentially thereof to the greatest possible extent. Even if the end plates 51, 52 are fastened by tightening up the bolts 53 so as to cause the thrust of screws to act on the metal plate stack 31 in the stacking direction, the first and second end plates 51, 52 can therefore be given parallelism with high accuracy.

Consequently, the rotor 4 can be rotated smoothly by giving improved parallelism to the bearings 58, 58 for supporting the opposite ends of the rotating shaft 41 of the rotor 4.

Apparently, the present invention can be modified and altered by one skilled in the art without departing from the spirit of the invention, and such modification is included within the scope of the invention as set forth in the appended claims.

What is claimed is:

1. A hub unit for use in electrically movable wheels which has a motor comprising a stator and a rotor, and a hub enclosing the motor therein and to be rotatingly driven by the rotation of the rotor, the hub unit comprising:
   a motor housing comprising the stator and pair of end plates, the end plates adapted to tighten-up the stator and
   a cooling means for cooling the motor with rotation of the hub, the cooling means comprising:
      a pump mechanism operable to discharge air from inside the hub to outside the hub, the pump mechanism being fixed to the hub and rotatable integrally with the hub,
      an inlet air port adapted to allow outside air to enter therethrough to the hub and into the motor, the inlet air port being formed through the motor housing, and
      at least one projection portion extending from an outer periphery of the motor housing at a position substantially aligned with the path of rotation of the pump mechanism, said projection portion adapted to operate the pump mechanism when the pump mechanism contacts said projection portion by rotation of the hub.

2. The hub unit for use in electrically movable wheels according to claim 1 wherein said projection portion comprises a fixing support shaft projecting in a fixed state from the motor housing on the axis of rotation of the hub and extending outward from the hub, and the air port for admitting air therethrough is formed in the vicinity of the fixing support shaft.

3. The hub unit for use in electrically movable wheels according to claim 2 wherein a tube is connected to the air port and has an end extending to a position on an electrically movable vehicle where no water enters the tube.

4. The hub unit for use in electrically movable wheels according to claim 1 wherein the pair of end plates are positioned opposed to each other, with a stack of metal plates held therebetween and fastened to each other with bolts, and having an outer peripheral surface left exposed to face an inner surface of the hub between the end plates.

5. The hub unit for use in electrically movable wheels according to claim 1 wherein the hub has enclosed therein a planetary gear mechanism operable by the rotation of the rotor,
   and the hub has inner teeth formed on an inner surface thereof and meshing with planetary gears of the planetary gear mechanism.

6. The hub unit for use in electrically movable wheels according to claim 1 further comprising a vehicle having a wheel with the hub unit incorporated therein.

* * * * *